Sept. 5, 1939.  W. J. YOUNG  2,171,720
HEEL GRADING MACHINE
Filed June 9, 1937  2 Sheets-Sheet 2
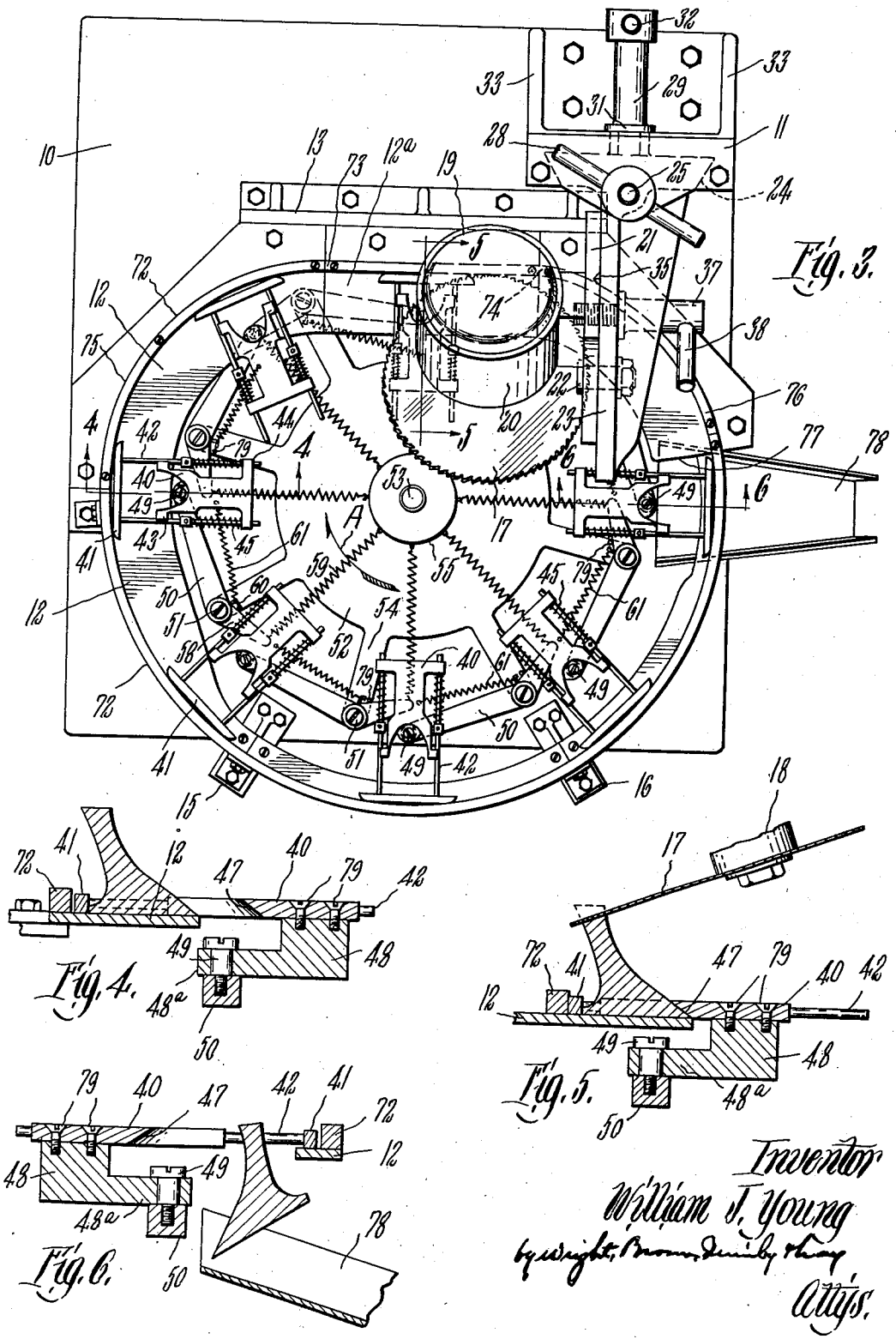

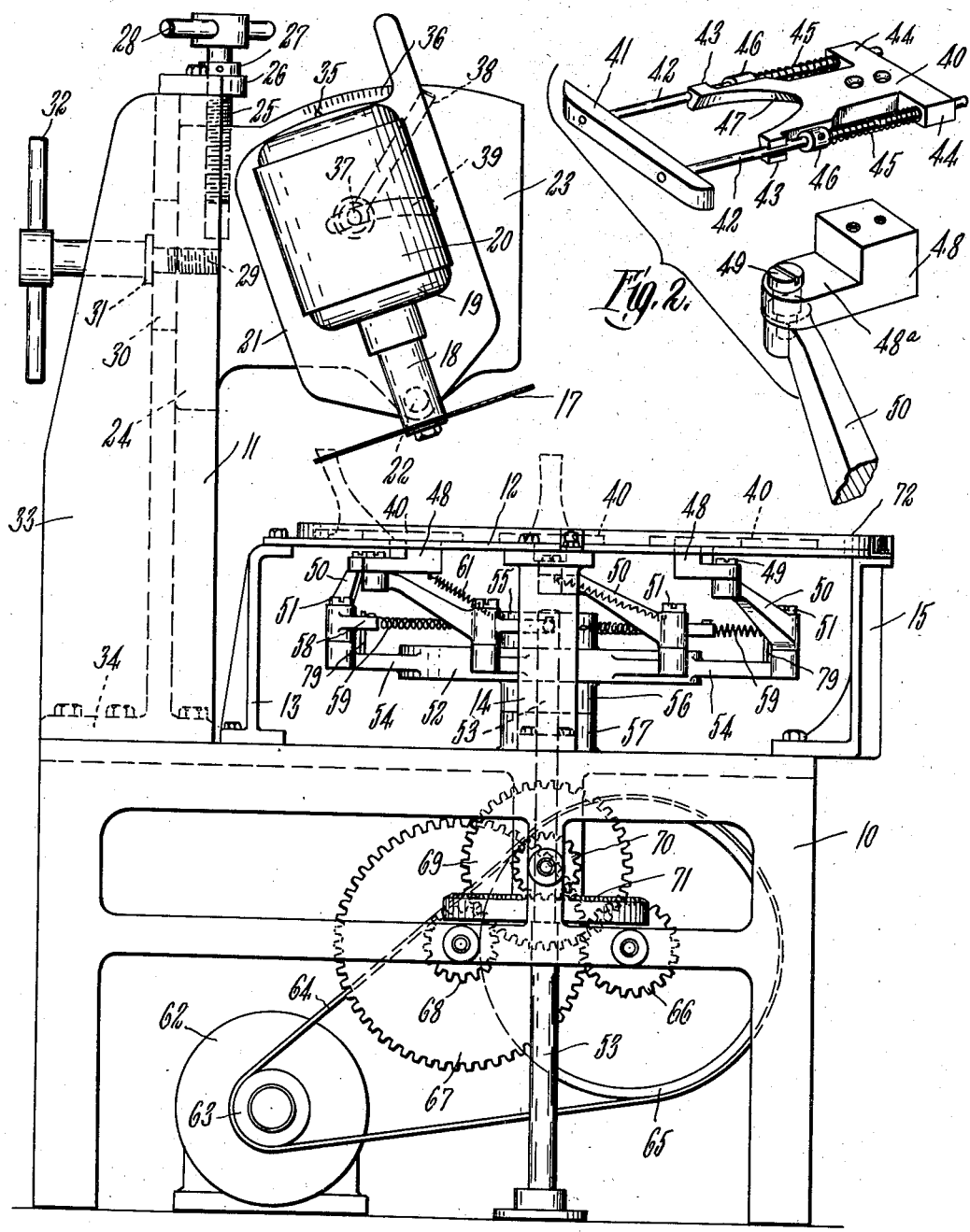

Patented Sept. 5, 1939

2,171,720

UNITED STATES PATENT OFFICE 2,171,720

HEEL GRADING MACHINE

William J. Young, Peabody, Mass.

Application June 9, 1937, Serial No. 147,309

11 Claims. (Cl. 1—42)

This invention relates to machines for cutting off the tread ends of shoe heels at a given height and bevel with respect to the plane of their seating ends. The type of heels referred to are those provided for women's footwear, which range in height from the neighborhood of one inch up to three inches or more. When cut and shaped with the prescribed contours on their sides, such heels are bounded at their opposite ends by parallel planes. They are finished for application to shoes by cutting a concave or "cup" in the seating end of the heel and cutting off the opposite or tread end at an angle suitable to cause the tread face of the heel to lie flat on the ground, or approximately so, when applied to a shoe and the latter is placed with its fore part on the ground. This trimming operation may be performed either before or after the cup is cut in the seating end. It determines the height of the heel as well as the angle of its tread face to the plane in which the rim of the seating end lies. The operation is called grading in the art, for which reason I call the machine of this invention a grading machine.

Heretofore this trimming or grading operation has been performed manually for the most part in commercial practice; the manipulation of an operator being required to move the heels into position for cutting, one at a time, and to control the relative motion between the heel and the cutting tool. My object has been to do the work automatically, with no more manual effort on the part of the operator or attendant than is required to place heels in a carrier; thereby avoiding the danger of injury to the operator's hands by the saw which is provided to grade the heels, saving labor, and increasing production. A further object has been to enable a succession of heels to be carried continuously past the saw without stoppage or interruption, and to be cut to any desired height and angle with perfect uniformity of all heels of the same shape and grade. Coupled with the last named object is that of obtaining such uniformity by a single simple adjustment of the cutter.

I have accomplished these objects in the machine which is shown in the accompanying drawings and described in the following specification; in which machine, its principles and equivalents, this invention consists.

In the drawings,

Fig. 1 is a side elevation of the machine referred to;

Fig. 2 is a perspective view of one of the heel carriers and a part of its propelling means, separated from one another and shown on a larger scale than that of Fig. 1;

Fig. 3 is a plan view of the machine;

Figs. 4, 5 and 6 are sectional views of the carriers in loading, cutting, and discharging positions taken on lines 4—4, 5—5 and 6—6 respectively of Fig. 3, and shown on a larger scale.

Like reference characters designate the same parts wherever they occur in all the figures.

The supporting structure of the machine comprises a base 10 of any desired construction, a column or post 11 rising from one corner of the base, and a stationary annular table 12 supported on the base by brackets 13, 14, 15 and 16.

The cutter preferably used for grading wood heels in the machine here shown is a circular saw 17 connected to the lower end of the armature shaft 18 of an electric motor 19 mounted in a holder 20 which is fastened to a plate 21. The plate in turn is connected at its lower end by a pivot 22 to a bracket arm 23 projecting from a slide 24 which is mounted in a vertical guideway in the column 11 and is movable up and down therein. A screw 25 is rotatably mounted in a cap plate 26 at the top of the column 11 and is fitted to a tapped hole in the slide. A collar 27 secured to the screw rests on the cap plate, supporting the weight of the slide and motor and taking the thrust of the screw when the latter is turned to raise the slide. It is thus turned by a handle 28. By this means the saw may be adjusted to different heights above the table 12. It is clamped rigidly in its various positions of adjustment by a screw 29 which passes through a slot 30 in the back of the column into a tapped hole in the slide. The screw has a head 31 arranged to bear on the outer face of the column, overlapping the edges of the slot 30, and a handle 32 by which it may be turned. The column is of channel formation having flanges 33, 33, as shown in Fig. 3 at its opposite sides, and a base web 34 which is bolted to the base.

The axis of the pivot 22 is perpendicular to the axis of the shaft 18 and parallel to the path in which the heels travel when passing the saw. Hence by swinging the plate 21 around the pivot axis, the inclination of the saw may be adjusted to cut off the heels at any desired angle. An index 35 beside a scale 36 on the adjacent surface of the bracket arm 23 measures the angle at which the saw is inclined. A screw 37 which has an operating handle 38 and passes through an arcuate slot 39 into the plate 21 secures the saw in its various adjustments.

The heels to be graded are propelled past the saw by carriers while resting on the stationary table 12. The present machine has eight such carriers, but this is not a critical number and there may be more or fewer. They are all alike and are designated by the same reference characters. Each consists of a rear clamp 40 having a concave recess on its outer end of a width and curvature large enough to receive the rear side of the largest heels, and a breast camp 41 having a straight inner side adapted to bear on the breast line of the seating end, i. e., the base of the heel. The outer face of the breast clamp is likewise straight throughout its major part but is rounded at the ends with a convex curvature for reasons presently described. The breast clamp rests on the annular table. It is engaged with the rear clamp by means of two parallel rods 42, 42, which are secured to it and pass slidingly through guides 43, 44 at opposite sides and ends of the rear clamp. The guides 44 are lugs having completely enclosed holes through which the rods pass in order to prevent the latter from spreading apart and becoming disconnected. The guides 43 may be of similar formation, but not necessarily so, and are here shown as having open grooves in their outer ends in which the rods lie. Springs 45 surround the rods and press against abutment collars 46, pinned or secured by set screws, to the rods. The springs react aaginst the lugs 44 and tend to move the breast clamp away from the rear clamp, the motion in this direction being limited by the guides 43 and collars 46. The rear clamp is undercut with a bevel 47 in its concave edge in order to hold the heel down against the table 12 when engaged with the sloping contours thereof in the manner presently described, and as shown in Fig. 5.

The rear clamp of each carrier is rigidly secured to a block 48 which is connected by a pivot 49 with lever 50, hereinafter referred to as a carrier-pushing or propelling lever, which lever is connected in turn by a pivot 51 with a rotary driver 52. The member which I have called a rotary driver is here shown as a disk secured to an upright shaft 53 at a level below the annular table, and having radial arms 54, to each of which one of the carrier pushing levers 50 is pivoted. It is likewise formed with hubs 55 and 56 on its upper and lower sides, the latter of which rests on a boss 57 on top of the base frame and in which the shaft 53 has a bearing.

Each lever 50 has a short arm 58 to which one end of a tension spring 59 is connected, the other end of this spring being anchored to the hub 55. The hub portion of the lever carries a hook 60 serving as an anchorage for one end of a tension spring 61 connected to the block 48 at a point inward from the pivot 49. The spring 59 exerts force yieldingly in a direction tending to move the heel carrier outward from the axis of revolution, (the lever arms 50 and 56 being tangentially arranged for that purpose), and the spring 61 tends to swing the carrier about pivot 49 toward alinement with the lever 50 and with the breast clamp of the carrier in advance of the lever.

The driver 52 is rotated in the direction of the arrow A shown in Fig. 3, so that the carriers are pushed ahead by their respective propelling levers in advance of the points at which such levers are connected to the driver. It is thus driven by any suitable means, of which an illustration is shown in Fig. 1, consisting of a motor 62, belt and pulley drive 63, 64, 65, and reduction gearing 66, 67, 68, 69, 70, the last element of which meshes with a crown gear 71 on the drive shaft. The gear reduction is such as to impart the fastest practicable speed to the heels past the saw, which will give a clean and true cut. It is within my contemplation to provide a speed changer of known character in the reduction gearing or between it and the motor to vary the speed in proportion to the cross sectional area of the heels being operated on. That is, heels having a small area of tread face may be successfully cut with a higher speed of travel than those having wider tread faces, and the machine may be provided with means for changing the speed of traverse accordingly, within the scope of the invention.

The annular table on which the heels are supported while being propelled by the carriers is provided with an annular wall or ledge 72 against which the breast clamp of the heel carrier bears and by which the clamp is operated to grip and release the heels and the carrier is guided in passing the saw. The part of the ledge adjacent to the saw from the point 73 to the point 74 is straight, and substantially parallel to the axis of the pivot 22 about which the saw is adjusted angularly. The heel clamp bears squarely against this part of the ledge and is guided thereby so that the heel is carried in an exactly defined path when passing the saw. This part of the ledge constitutes a guide for the heel carrier which maintains the longitudinal vertical mid plane of the heel parallel to itself in all positions from a point prior to its first engagement with the saw until it has been completely cut through. The adjacent portion 12a of the supporting table is correspondingly straight and substantially parallel with the axis of the saw adjustment pivot 22. Thus the heel is maintained at an invariable angle to the plane of the saw, and all heels of the same shape and dimensions are brought to the same angle with respect to the saw, whereby all are cut exactly alike.

This is an important novel feature of the invention in combination with means for propelling a succession of heel carriers, inasmuch as it causes all of the heels to be transported in the same path and enables one adjustment of the saw, as to height above the table and inclination to the plane of the table, to grade a succession of heels to exactly the same height and with exactly the same angle of tread face and with the tread face in a plane.

The ledge or guide 72 from a point near that to which the reference character 75 is applied, (which point is farther distant from the axis of shaft 53 than is the point 73), is curved with a smooth curvature such as to bring it into tangent junction with the straight guide at or near the point 73. This part of the ledge serves as a cam acting to close the breast clamp member of the heel carrier against the heel. A similar but oppositely situated portion of the ledge from the point 74 to a location near that to which the reference character 76 is applied, permits the carrier to release the heels. From the point 76 to the point 75, in clockwise rotation, the ledge 72 is circular and concentric with the shaft 53. When traversing this concentric path, the breast clamp is separated from the rear clamp by the springs 45; the rear clamp being then arrested at a point where the opening of the carrier is wide enough to receive the largest heels. A stop 79 on the driver arm suitably located in the path of the short lever arm 58 thus restrains the rear clamp against the force tending to move it outward exerted by spring 59, which is made of preponderating strength in order to effect secure gripping of the heel. Each driver arm has such a stop located as described. As the carrier travels along the cam portion of the ledge and the straight guide portion thereof to the point where the latter becomes perpendicular to a diameter of the rotary driver, the breast clamp is pushed inward against the resistance of springs 45 by the reaction of such cam portion, while inward movement of the rear clamp is substantially prevented by spring 59, until the heel is firmly gripped between the clamps, while the overlap of the rear clamp, on the heel, due to the bevel 47, holds the seating end of the heel firmly on the table. Further inward movement of the breast clamp, after the heel is thus gripped, moves the carrier as a whole inward against the yielding resistance of its spring 59. The opposite action takes place after the carriers pass the saw, whereby the heels are released.

The loading station is at the position of the line 4—4 in Fig. 3, and extends to a considerable distance to either side of that position. The operator's task is to place the heels in the open carriers as the latter successively arrive in this location. The heels rest on their bases on the table and are pushed along by the side rod of the carrier until gripped between the clamps by inward movement of the breast clamp. The annular table is wide enough to support the heels from the loading position to the discharging position 77, where it is sharply cut away. The heels there fall from the table into a chute 78. From the discharging position to the loading position the table may be narrow,—only wide enough to support the breast clamp, as shown; but if desired, it may be of greater width.

The contact surfaces of the guide ledge and breast clamps are of smooth finished metal to minimize the frictional resistance, and may be lubricated. The springs 61 are so applied as to counteract in sufficient measure the tendency of friction to tilt the carriers out of their positions normal to the guide ledge, and also to advance the breast clamp end of the carrier as it traverses the cam portions of the ledge. The width of bearing of the breast clamps on the ledge contributes to the same end. Actual practice has demonstrated that the carriers operate in the manner described. It may be noted also that the shape of the block 48 through which the pivot of the pushing lever is connected with the carrier, enables the pivot to be located near enough to the outward extremity of the carrier to reduce the turning moment due to frictional drag of the breast clamp to a very small value. This block is secured to the carrier by two screws 79 which prevent any relative rotation between these blocks, and it has a lug 48a projecting outwardly at a level below the stationary table, whereby interference with the inner edge of the table is avoided.

For thus grading or trimming heels made of materials other than wood which cannot be satisfactorily cut by a circular saw, other cutters may be substituted for the saw in a machine otherwise like or equivalent to that here described. Thus a cutter head with inserted cutters, of known character, or a grinding disk having a plane active face may be mounted on the armature shaft in place of the saw. Or a cylindrical or conical grinding wheel with a peripheral grinding face may be mounted on the cutter holder with its under limb in position to act on the passing heels and its axis in a plane perpendicular to the path in which the heels travel; the cutter holder being adjustable in the same manner as shown to alter the inclination of the grinding wheel. Heels passing in a straight path under such a grinding wheel are ground off on a true plane at their tread ends. Bearings for a grinding wheel so located and gearing or driving connections to the motor, with or without a rearrangement of the motor, may be provided on the holder here shown, or an equivalent thereof, within the scope of this invention and within the skill of a competent machine designer. Such cutting tools, as well as a circular saw specifically, in the machine combination are included within the protection sought by the appended claims.

What I claim and desire to secure by Letters Patent is:

1. A machine for cutting off the ends of heels comprising a cutter adjustable to vary its height and inclination, and automatic means for carrying a succession of heels in a straight line path past said cutter and at an invariable angle with respect to the cutter while passing it, said carrying means comprising clamps for gripping the bases of the heels.

2. A heel grading machine comprising automatically self adjusting heel gripping carriers, means for propelling said carriers to advance a succession of heels in a given path, a cutter arranged to cut the tread ends of the passing heels in a given plane, and means for adjusting the cutter angularly about an axis parallel to the path in which the heels are moved.

3. A heel grading machine consisting of a plurality of heel carriers, each having clamps for grasping the base end of a heel, means for propelling said heel carriers continuously in a circuit, means for constraining said carriers to travel one after another in a straight line in at least a portion of their circuit, a cutter mounted in position to cut heels while traversing said straight line portion, the cutter being arranged in position to trim the tread ends of heels travelling in said straight line and being adjustable angularly about an axis parallel to the same line.

4. A heel grading machine comprising a rotary driver, a plurality of heel carriers connected with said driver to be propelled thereby, guiding means for causing said carriers to travel in a straight line in a part of their orbit, and a circular saw mounted in position to act upon heels transported by said carriers in said straight line portion of the orbit, said saw being mounted for adjustment toward and away from the orbits of the carriers, whereby to produce higher or lower heels, and being also adjustable angularly about an axis parallel to the straight portion of the orbit whereby to alter the inclination of the cut made by the saw.

5. A heel grading machine comprising a stationary annular table having an upstanding guide ledge or wall, a plurality of heel carriers movable over the table in guided engagement with the wall, a rotatable driver connected with said carriers for propelling them, a part of said guiding wall being concentric with the axis of the driver and another part thereof being straight and at a distance from said axis less than the distance therefrom of said concentric portion, the parts of the wall between the straight and concentric portions being curved to merge smoothly with both of said portions, a circular saw mounted in position to act upon heels carried by the carriers while traversing said straight portion, and means for mounting the saw with provision for adjustment to different heights above the table and for angular adjustment about an axis parallel to said straight portion.

6. A heel grading machine comprising a rotary driver, an annular table, and an associated upright guide wall surrounding the axis of said driver, being concentric therewith throughout a portion of its circuit, having a straight portion at a less distance from the axis than said concentric portion and having intermediate portions of varying curvature merging with the straight and concentric portions on smooth curves, heel carriers each consisting of a rear clamp flexibly connected with the driver to be propelled thereby, and a breast clamp slidingly connected with the rear clamp and arranged to bear against the inner face of said wall, spring means acting between said clamps tending to force the breast clamp outwardly against the wall and reacting to force the rear clamp inwardly toward the axis, and spring means reacting between the driver and rear clamp of each carrier tending to force the rear clamp outwardly, whereby the guide wall causes the carriers to grip heels while approaching said straight portion, to hold them while traversing the straight portion, and to release them after leaving the straight portion; combined with a cutter arranged to act upon heels while traversing said straight portion.

7. A heel grading machine comprising a rotatable driver, a stationary annular table and a guide wall surrounding the axis of said driver, a portion of the guiding wall being concentric with the axis, another portion being straight and at a less distance from the axis than the concentric portion, and other portions between the straight and concentric portions being of varying curvature and merging smoothly with said straight and concentric portions, a plurality of heel carriers each consisting of a breast clamp arranged to travel on the annular table in contact with the inner face of said wall, a rear clamp, connecting and guiding means between the clamps constructed and arranged to permit separation and approach of one with respect to the other, springs acting between said clamps tending to separate them from one another, levers tangentially arranged with respect to the driver and guiding wall, each lever being in pivoted connection with the driver and with the heel clamp of one of the carriers, spring means reacting between each lever and the driver for exerting force outwardly on the rear clamp to which such lever is connected, and spring means acting between the rear clamp of each carrier and its respective driving lever in a manner to exert turning force on the carrier about its pivot connection in the opposite direction to the frictional drag of the carrier on the guiding wall, and a cutter arranged to act on heels while traversing the straight portion of the guiding wall.

8. A heel grading machine comprising a plurality of heel carriers, means for driving said carriers in a given circuit including a straight path as part of said circuit, automatic means for operating the carriers to clamp the base ends of heels while traversing such straight path and to release them on leaving that path, and means adjustably supporting the cutting tool in position to operate on heels traversing the straight path, said means having provisions for adjusting the cutting tool toward and away from said path and for inclining it in different planes all of which are parallel to said path.

9. In a machine for operating upon heels, a table on which the heels are supported and over which they are moved while being operated on, combined with a heel carrier consisting of co-operating clamps, one adapted to bear on the breast edge of the heel at its seating end and the other to engage the back of the heel, means for moving one of said clamps toward and away from the other, the second named clamp having an overhanging formation in its heel engaging part arranged to overlie the edge of the seating end of the heel and to exert a component of pressure on the heel toward the table, and means for moving said carrier laterally over the table.

10. A heel grading machine comprising a driver, heel carriers connected with said driver to be propelled thereby, said carriers comprising clamps adapted to grip the base end only of a heel and being self adjusting to heels of different sizes, means for bringing said clamps toward one another in the course of the travel of the carriers for gripping the base end of a heel previously placed loosely between the clamps, and a cutter mounted in position to cut off the end of a heel opposite to the end so gripped by said carrier.

11. A heel grading machine comprising driving means, a plurality of heel carriers connected with said driving means for propulsion thereby in a prescribed path, said carriers having normally separated clamps in said path adapted to receive the base of a heel between them when separated, a cutter located at one side of a portion of said path in position for cutting off the tread end of heels transported by and protruding from the carriers, a support located at the opposite side of said carrier path from the cutter in relation to said clamps such as to engage the base end of a heel while the heel is embraced by said clamps, and means for closing the clamps against the sides of a heel so engaged with the support while the carrier approaches the location of the cutter.

WILLIAM J. YOUNG.